(12) United States Patent
O'Brien et al.

(10) Patent No.: US 11,542,658 B2
(45) Date of Patent: Jan. 3, 2023

(54) HIGH STRENGTH POLYVINYLIDENE FLUORIDE COMPOSITE

(71) Applicant: Arkema Inc., King of Prussia, PA (US)

(72) Inventors: Gregory Scott O'Brien, Downingtown, PA (US); Ramin Amin-Sanayei, Malvern, PA (US); Saeid Zerafati, Villanova, PA (US); James T. Goldbach, Paoli, PA (US)

(73) Assignee: Arkema Inc., King of Prussia, PA (US)

( * ) Notice: Subject to any disclaimer, the term of this patent is extended or adjusted under 35 U.S.C. 154(b) by 340 days.

(21) Appl. No.: 16/630,600

(22) PCT Filed: Jul. 16, 2018

(86) PCT No.: PCT/US2018/042227
§ 371 (c)(1),
(2) Date: Jan. 13, 2020

(87) PCT Pub. No.: WO2019/014661
PCT Pub. Date: Jan. 17, 2019

(65) Prior Publication Data
US 2020/0172719 A1 Jun. 4, 2020

Related U.S. Application Data

(60) Provisional application No. 62/532,554, filed on Jul. 14, 2017, provisional application No. 62/655,481, filed on Apr. 10, 2018.

(51) Int. Cl.
C08L 27/16 (2006.01)
C08F 214/28 (2006.01)
C08K 7/14 (2006.01)
C08K 9/08 (2006.01)
C08K 7/06 (2006.01)
D06M 15/256 (2006.01)
C08F 214/22 (2006.01)
C08F 220/06 (2006.01)
C08F 220/18 (2006.01)
D06M 15/263 (2006.01)
C08F 2/38 (2006.01)
D06M 101/40 (2006.01)

(52) U.S. Cl.
CPC ......... D06M 15/256 (2013.01); C08F 214/22 (2013.01); C08F 214/28 (2013.01); C08F 220/06 (2013.01); C08F 220/18 (2013.01); C08K 7/06 (2013.01); C08K 7/14 (2013.01); C08K 9/08 (2013.01); C08L 27/16 (2013.01); D06M 15/263 (2013.01); C08F 2/38 (2013.01); C08K 2201/016 (2013.01); C08L 2205/035 (2013.01); D06M 2101/40 (2013.01)

(58) Field of Classification Search
CPC ...... C08K 7/14; C08K 9/08; C08K 2201/016; C08K 7/06; C08L 27/16; C08L 2205/035; C08F 214/24
See application file for complete search history.

(56) References Cited

U.S. PATENT DOCUMENTS

| 4,749,610 | A | 6/1988 | Katsuragawa et al. |
| 7,241,817 | B2 | 7/2007 | Bonnet et al. |
| 7,351,498 | B2 | 4/2008 | Watarai et al. |
| 8,883,898 | B2 | 11/2014 | Hochstetter et al. |
| 2001/0006727 | A1 | 7/2001 | Lee et al. |
| 2004/0024130 | A1 | 2/2004 | Nelson et al. |
| 2006/0074168 | A1* | 4/2006 | Nelson ............ C08L 53/00 524/445 |
| 2010/0189946 | A1 | 7/2010 | Hochstetter et al. |
| 2011/0003927 | A1 | 1/2011 | Booze et al. |
| 2016/0002413 | A1 | 1/2016 | Wlassics et al. |
| 2016/0038864 | A1 | 2/2016 | Calcaterra et al. |

FOREIGN PATENT DOCUMENTS

| CN | 1111258 A | 11/1995 | |
| CN | 1413272 A | 4/2003 | |
| CN | 105898984 A | 8/2016 | |
| WO | WO 2013/110740 A1 | 8/2013 | |
| WO | WO 2017/087484 A1 | 5/2017 | |
| WO | WO-2017087484 A1 * | 5/2017 | ............ B32B 5/022 |

OTHER PUBLICATIONS

Tran, M Q et al; Carbon Fibre Reinforced Poly(Vinylidene Fluoride) : Impact of Matrix Modification on Fibre/Polymer Adhesion; Composites Science and Technology; vol. 68, No. 7-8; Jun. 1, 2008; pp. 1766-1776.

Zhao, J et al; A Comparative Study of Fibre/Matrix Interface in Glass Fibre Reinforced Polyvinylidene Fluoride Composites; Colloids and Surfaces A: Physochemical and Engineering Aspects; vol. 413; Feb. 24, 2012; pp. 58-64.

* cited by examiner

Primary Examiner — Robert D Harlan
(74) Attorney, Agent, or Firm — Joanne Rossi

(57) ABSTRACT

The invention relates to fluoropolymer composites having a fluoropolymer matrix containing a functionalized fluoropolymer composition, and reinforced with fibers. The fibers can be chopped fibers, long fibers, or a mixture thereof, and the fluoropolymer matrix preferably is based on polyvinylidene fluoride. Any type of fibers, sized or unsized may be used with the functionalized fluoropolymer matrix composition to form the fluoropolymer composite.

18 Claims, No Drawings

HIGH STRENGTH POLYVINYLIDENE FLUORIDE COMPOSITE

CROSS-REFERENCE TO RELATED APPLICATIONS

This application is a national stage application under 35 U.S.C. § 371 of PCT/US2018/042227 filed Jul. 16, 2018, which claims the benefit of U.S. Provisional Patent Application No. 62/655,481, filed Apr. 10, 2018 and No. 62/532,554, filed Jul. 14, 2017.

FIELD OF THE INVENTION

The invention relates to fluoropolymer composites having a fluoropolymer matrix containing a functionalized fluoropolymer composition, and reinforced with fibers. The fibers can be chopped fibers, long fibers, or a mixture thereof, and the fluoropolymer matrix preferably is based on polyvinylidene fluoride. Any type of fibers, sized or unsized may be used with the functionalized fluoropolymer matrix composition to form the fluoropolymer composite

BACKGROUND OF THE INVENTION

Fluoropolymers, for example those based on vinylidene fluoride $CF_2=CH_2$ (VDF) are known to have excellent mechanical stability properties, very great chemical inertness, low surface energy, electrochemical stability, and good aging resistance. These qualities are exploited in various end-use applications. Unfortunately, due to their inertness, it is difficult to bond to or get good adhesion of fluoropolymers to other materials.

Functional groups have been added to fluoropolymers in order to increase adhesion to other materials, add some level of hydrophilicity and wettability, and provide reactive sites, such as for cross-linking and subsequent chemical modification. Functionality has been added by several means, such as, by direct copolymerization of a functional monomer with the fluoromonomers, and by a post-polymerization grafting mechanism, such as the grafting of maleic anhydride onto a polyvinylidene fluoride homopolymer or copolymer, as is described in U.S. Pat. No. 7,241,817, to form KYNAR® ADX resins available from Arkema Inc. WO 2013/110740 and U.S. Pat. No. 7,351,498 further describe functionalization of a fluoropolymer by monomer grafting or by copolymerization.

Fibers are known for use as reinforcement in many types of polymer composites. Long fibers can be sized or coated with a polymer or pre-polymer that serves as a binder to hold the fibers together or act to be compatible with or react with the polymer matrix of a long fiber composite. The sized long fibers can then be impregnated with a polymer matrix by a series of different methods to form a tape or sheet. This impregnated sheet or tape is then consolidated into a final article by a series of different methods (compression molding, automatic tape placement, etc) to make a consolidated thermoplastic composite article. Articles made of long fibers generally contain at least 45 weight percent, preferably more than 50 weight percent, and often more than 60 to 70 weight percent of reinforcing fiber.

In a continuous fiber article, the properties of the article are dominated by the properties of the fiber—the polymer acting as a binder/matrix to hold the fibers together.

U.S. Pat. No. 8,883,898 discloses impregnating continuous fibers with a fluoropolymer that has been functionalized, preferably by grafting with maleic anhydride.

Different fiber sizings have been developed for different polymer matrices, to improve compatibility between the sized fibers and the matrix polymer. Unfortunately, current fiber sizings have poor compatibility with fluoropolymer. Without good compatibility, and therefore good distribution and good adhesion between the fibers and a fluoropolymer matrix, the benefits of using fiber reinforcement have not been fully realized.

Surprisingly, it has now been found that the use of a functionalized fluoropolymer matrix, along with fibers that have been treated or sized to contain functionality, results in a chemical interaction of the fibers with the matrix, this interaction improves the adhesion of the fibers to the matrix, which in turn improves tensile and flexural strength of the composite.

SUMMARY OF THE INVENTION

The invention relates to a fiber-reinforced fluoropolymer composite having a functionalized fluoropolymer composition matrix; and fibers. The matrix makes up 2 to 100 weight percent preferably from 10 to 100, and most preferably from 40 to 60 weight percent of the composite, with 15 to 60 weight percent of said fibers.

The functionalized fluoropolymer matrix may be a) a fluoropolymer block copolymer comprising a long fluoropolymer block, and one or more short polyacrylic acid end blocks;

b) a graft copolymer having a fluoropolymer backbone with one or more grafted functional groups, where in one embodiment the grafted monomer is not a maleic anhydride;

c) a fluoropolymer having functional comonomer units as part of the backbone polymer;

d) a blend of a non-functional fluoropolymer and a compatible functional non-fluoropolymer;

e) a block fluoropolymer having both a functional comonomer with vinylidene fluoride monomer units, and one or more short polyacrylic acid end blocks;

f) a blend of one or more non-functional fluoropolymers with any of functional fluoropolymers of a), b) or c).

Preferably the fluoropolymer matrix is a polyvinylidene fluoride homopolymer, or a copolymer with at least 60 weight percent of vinylidene fluoride monomer units.

In one embodiment the fiber-reinforced fluoropolymer composite of claim 3, wherein said compatible functional non-fluoropolymer comprises one or more functional (meth) acrylic polymers.

In a preferred embodiment, the fiber-reinforced fluoropolymer composite of claim 1, wherein said fibers are selected from the group consisting of carbon fibers, glass fibers, and aramid fibers, or mixtures thereof.

In one embodiment the fiber-reinforced fluoropolymer composite of claim 1, wherein said fibers comprise a sizing having functional groups capable of bonding with the functionalized fluoropolymer matrix composition.

In one embodiment the fiber-reinforced fluoropolymer composite of claim 11, wherein said sizing is a functionalized fluoropolymer composition.

DESCRIPTION OF THE INVENTION

As used herein "copolymer" refers to any polymer having two or more different monomer units, and would include terpolymers and those having more than three different monomer units.

The references cited in this application are incorporated herein by reference.

Percentages, as used herein are weight percentages, unless noted otherwise, and molecular weights are weight average molecular weights as measured by GPC using a PMMA reference, unless otherwise stated. The molecular weight can alternatively be measured indirectly by measuring the melt viscosity or melt flow rate under given conditions.

The invention relates to fluoropolymer composites having a functionalized fluoropolymer matrix composition, and fiber-reinforcement.

Fluoropolymer:

Fluoropolymers useful in the invention are thermoplastic homopolymers and copolymers having greater than 50 weight percent of fluoromonomer units by weight, preferably more than 65 weight percent, more preferably greater than 75 weight percent and most preferably greater than 90 weight percent of one or more fluoromonomers. Useful fluoromonomers for forming the fluoropolymer include, but are not limited to: vinylidene fluoride (VDF or $VF_2$), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof.

Especially preferred fluoropolymers are polyvinylidene fluoride (PVDF) homopolymers, and copolymers, such as KYNAR® resins from Arkema Inc, and ethylene tetrafluoroethylene (ETFE) copolymers. While the invention applies to all fluoropolymers and their copolymers, vinylidene fluoride polymers will be used to illustrate the invention. One of ordinary skill in the art will understand and be able to apply the specific references to PVDF to these other thermoplastic polymers, which are considered to be within the realm of, and embodied in the invention.

The PVDF used in the invention is generally prepared by means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. In one preferred embodiment, the surfactant is a non-fluorosurfactant, and the final product produced is fluorosurfactant-free. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 120° C. Once the desired amount of polymer has been reached in the reactor, the monomer feed will be stopped, but initiator feed is optionally continued to consume residual monomer. Residual gases (containing unreacted monomers) are vented and the latex or suspension is recovered from the reactor.

The PVDF polymerization results in a latex generally having a solids level of 10 to 60 percent by weight, preferably 10 to 50 percent. The latex is generally reduced to a powder form by spray drying, coagulation, or other known process, to produce a dry powder.

Functionalized Fluoropolymer Composition:

The functionalized fluoropolymer composition forming the matrix of the fiber-reinforced fluoropolymer composite of the invention may take any form. Especially preferred functionalized fluoropolymer compositions for the matrix include a) a fluoropolymer block copolymer comprising a long fluoropolymer block, and one or more short functional end blocks;

b) a graft copolymer having a fluoropolymer backbone with one or more grafted functional groups;

c) a fluoropolymer having functional comonomer units as part of the backbone polymer;

d) a blend of a non-functional fluoropolymer and a compatible functional non-fluoropolymer;

e) a block fluoropolymer having both a functional comonomer with vinylidene fluoride monomer units, and one or more short polyacrylic acid end blocks;

f) a blend of one or more non-functional fluoropolymers with any of functional fluoropolymers of a), b) or c).

Functionalized Fluoropolymer Block Copolymer:

The functionalized fluoropolymer may be a block copolymer having a long fluoropolymer or fluoro-copolymer chain, and one or more short functional end blocks. The functional end blocks are formed from functional chain transfer agents.

The functional chain transfer agents of some embodiments are low molecular weight functional polymers. By low molecular weight is meant a polymer with a degree of polymerization of less than or equal to 1,000, and preferably less than 800. In a preferred embodiment, the weight average molecular weight of the polymeric chain transfer agent, as measured by GPC, is 20,000 g/mole of less, more preferably 15,000 g/mole, and more preferably less than 10,000 g/mole. In one embodiment the weight average molecular weight is less than 5,000 g/mole. The low molecular weight functional chain transfer agent is a polymer or an oligomer having two or more monomer units, and preferably at least three or more monomer units. In some embodiments, the low molecular weight functional chain transfer agent is a polymer or an oligomer having ten or more monomer units.

By functional polymeric chain transfer agents, as used in some embodiments, is meant that the low molecular weight polymer chain transfer agent contains one or more different functional groups. The chain transfer agent has the formula $(CH_2-CH-(X)-R)_y$, where y is a integer of between 2 to 1000, X is a linking group including, but not limited to, a covalent or ionic bond, an alkyl, alkene, alkyne, substituted alkyl, substituted alkene, aryl, ester, ether, ketone, amine, amid, amide, organo-silane, and R is a functional group.

The functional group (R) provides functionality, and can be provided by the polymerization of functional monomers—either as the sole monomer, or as a comonomer. The functionality could be added by introducing functional chain transfer agents to the polymerization media prior to polymerization and/or during the polymerization reaction. Useful functional groups include, but are not limited to, carboxylic, hydroxyl, siloxane, ether, ester, sulfonic, phosphoric, phosphonic, sulfuric, amide and epoxy groups, or a mixture thereof. Some embodiments include functional chain transfer agents including, but not limited to, polyacrylic acid, polylactic acid, polyphosphonic acid, polysulfonic acid, and polymaleic acid. In the case of acid groups, the functional groups may be partially or fully neutralized and/or esterified. Polyacrylic acid chain transfer agents are a preferred embodiment.

The low molecular weight functional chain transfer agent is present in the polymerization reaction at from 0.1 to 25 percent by weight, based on the total amount of monomer. Preferably the level is from 0.25 to 15 percent by weight, more preferably from 0.5 to 10 weight percent. In one embodiment, the level of the chain transfer agent is from greater than 2 weight percent, to 10 weight percent, and even 2.2 to 8 weight percent. If the level of the functionalized chain transfer agent is too low, there is not enough functionality provided to the PVDF to provide any significant performance advantage, nor enough to obtain the desired molecular weight.

The low molecular weight polymeric functional chain transfer agent reacts with the active center of the growing polymer chain, resulting in the extraction of the H of the CH and the attachment of the residual low molecular weight functional group to the polymer chain. This polymeric chain transfer agent differs from a comonomer, in that it does not disrupt the sequencing distribution of the PVDF backbone. The presence of the residual low molecular weight functional polymer chain transfer agent can be detected in the functionalized PVDF by means of NMR.

In addition to the low molecular weight, functional chain transfer agent of some embodiments, other chain transfer agents typically used in the polymerization of PVDF may also be added at levels to provide the desired molecular weight.

In general, a portion of, or all of the low molecular weight chain transfer agent is added to the initial charge, to prevent the formation of extremely high molecular weight polymer that is non-soluble in polar solvents—and which exists as gels. The remainder of the chain transfer agent can then be added continuously, or in small portions through the remainder of the polymerization.

The functional chain transfer agent creates a block copolymer, with a fluoropolymer block and the functional non-fluoropolymer end block. In another embodiment, hydrophilic functionality is present as both a low level of functional monomer as part of the fluoropolymer backbone, and also as a hydrophilic non-fluoropolymer end block. Surprisingly, this block copolymer shows a synergistic effect, even with very low hydrophilic monomer levels in the fluoropolymer block. The hydrophilic comonomers in the fluoropolymer block may be used in an amount, for example, of from about 0.0001 to about 10 weight percent based on total monomer. Hydrophilic monomer levels of less than 500 ppm, less than 250 ppm, less than 100 ppm, less than 50 ppm, and even down to 10 ppm based on the total monomer in the fluoropolymer block provides a synergystic improvement in adhesive and other properties.

The hydrophilic monomer during the synthesis of the fluoropolymer block is either randomly distributed in the polymer background, forms a homopolymer, or is unreacted. In one embodiment the hydrophilic monomer is a (meth)acrylic monomer, and the non-fluoropolymer block is a polymer of (meth)acrylic monomers. In this case, the total amount of the (meth)acrylic monomer units that are randomly distributed in the fluoropolymer block is less than 40 mole percent, preferably less than 30 mole percent, preferably less than 25 mole percent, and even less than 20 mole %, less than 15 mole percent, and even less than 10 mole percent of the total (meth)acrylic monomer units in the entire block copolymer. The mole percent of (meth)acrylic monomer units randomly distributed in the fluoropolymer block of the block copolymer is low due to the low mole percent of (meth)acrylic monomer in the fluoropolymer block, and the higher level of (meth)acrylic monomer units incorporated into the non-fluoropolymer block. The (meth)acrylic monomer in the fluoropolymer block can be the same or different than the (meth)acrylic monomer in the non-fluoropolymer block. In one preferred embodiment, acrylic acid monomer units are present in both the fluoropolymer block and the non-fluoropolymer block.

The functional fluoropolymer block of the block copolymer has a high molecular weight, where the end groups having formula $-CF_2H$ and/or $-OSO_3H$ and/or $-OH$ are in an amount of at less than 30 mmoles per Kg of vinylidene fluoride (VDF) recurring units, preferably less than 25 mmoles per Kg VDF, and more preferably less than 20 mmoles per Kg VDF.

In a preferred embodiment, the chain transfer agent is used in conjunction with a surfactant to stabilize the growing polymer chains. The surfactant can be any surfactant known to stabilize fluoropolymers, and can be one or more fluorinated surfactants, one or more non-fluorinated surfactants, or a mixture of fluorinated and non-fluorinated surfactants. In a preferred embodiment, the polymerization is carried out without any fluorinated surfactant, as has been shown by Applicant in previous patent applications. Useful non-fluorinated surfactant can produce stable emulsions having a particle size in the range of from 50 to 250 nm.

Functionalized Graft Fluorocopolymer:

The functional fluoropolymer matrix of the invention composite may contain some amount of fluoropolymer that has been grafted with a unsaturated carboxylic functional monomer, as described in U.S. Pat. No. 7,241,817, or grafted with an epoxy or amide functionality. The grafting process involves the steps of:

a) melt blending the fluoropolymer with the unsaturated monomer;

b) forming the blend obtained in a) into films, sheets, granules or powder;

c) exposing the products from step b) are exposed, in the absence of air, to photon ($\gamma$) or electron ($\beta$) irradiation with a dose of between 1 and 15 Mrad; and d) the product obtained at c) is optionally treated in order to remove all or part of the unsaturated monomer that has not been grafted onto the fluoropolymer.

The grafted fluoropolymer obtained can be used as made or as a blend either with the same fluoropolymer but not grafted, or with another fluoropolymer. The level of grafted fluoropolymer in the matrix will be from 1 to 100 weight percent, preferably from 3 to 50 weight percent, and most preferably from 5 to 20 weight percent.

Examples of useful unsaturated carboxylic monomers include carboxylic acids having 2 to 20 carbon atoms, such as acrylic acid, methacrylic acid, maleic acid, fumaric acid, and itaconic acid; the functional derivatives of these acids, including but not limited to anhydrides, ester derivatives, amide derivatives, imide derivatives and metal salts (such as alkali metal salts) of unsaturated carboxylic acids. Mention may also be made of undecylenic acid; unsaturated dicarboxylic acids having 4 to 10 carbon atoms and their functional derivatives, particularly their anhydrides, are particularly preferred grafting monomers.

Examples of other grafting monomers comprise $C_1$-$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, the monoamide of fumaric acid, the diamide of fumaric acid, the N-monoethylamide of fumaric acid, the N,N-diethylamide of fumaric acid, the N-monobutylamide of fumaric acid and the N,N-dibutylamide of fumaric acid; imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate.

Step a) is carried out in any mixing device, such as extruders or mixers used in the thermoplastics industry.

Regarding the proportions of the fluoropolymer and the unsaturated monomer, the proportion of fluoropolymer is advantageously, by weight, from 90 to 99.9% for 0.1 to 10% of unsaturated monomer, respectively. Preferably, the proportion of fluoropolymer is from 92 to 99.0% for 1.0 to 8% of unsaturated monomer, respectively, and more preferably from 1 to 5 weight % of unsaturated grafted monomer.

With regard to step c), the products recovered after step b) are advantageously packaged in polyethylene bags, the air is expelled and then the bags are closed. As regards the method of irradiation, it is equally possible to use electron irradiation, more commonly known as beta irradiation, and photon irradiation, more commonly known as gamma irradiation. Advantageously, the dose is between 2 and 6 Mrad and preferably between 3 and 5 Mrad.

With regard to step d), the ungrafted monomer may be removed by any means. The proportion of grafted monomer with respect to the monomer present at the start of step c) is between 50 and 100%. A washing operation with solvents inert with respect to the fluoropolymer and to the grafted functional groups may be carried out. For example, when maleic anhydride is used for the grafting, chlorobenzene may be used for the washing. It is also possible, more simply, to vacuum degas the product recovered in step c).

In one embodiment, a maleic anhydride grafted fluoropolymer matrix is used only with short (chopped) fibers. In another embodiment a maleic anhydride grafted functional matrix is used with a fluoropolymer-sized fiber.

In one embodiment, the grafted monomer is not a maleic anhydride.

Functional Fluoropolymer with Functional Comonomers

The functional PVDF matrix of the invention may be a copolymer of 80 to 99 mole percent, and preferably 85 to 98.8 mole percent of one or more fluoromonomers that include, but are not limited to, vinylidene fluoride (VDF), tetrafluoroethylene (TFE), ethylene-tetrafluoroethylene (ETFE) and/or chlorotrifluoroethylene (CTFE). The chemical inertness of the fluoropolymer provides long composite life compared to non-fluoropolymers. In a preferred embodiment, the copolymer contains 80 to 99 mole percent of VDF monomer units.

The copolymer also includes one or more functional comonomers that improve adhesion, used at low levels of from 0.005 to 20 mole percent, preferably 0.01 to 10 mole percent, and most preferably 0.03 to 5 mole percent, based on the copolymer. The presence of the functional comonomer provides the copolymer with better adhesion than a fluoro-homopolymer.

Random copolymers are most useful, as this provides a better distribution of adhesive groups, leading to better adhesion. Graft copolymers are also contemplated by the invention.

Useful comonomers generally contain polar groups, or are high surface energy. Examples of useful comonomers include, but are not limited to, one or more of the following: vinyl acetate, 2,3,3,3-tetrafluoropropene (HFO-1234yf), 2,3,3 trifluoropropene, hexafluoropropene (HFP), and 2-chloro-1-1-difluoroethylene (R1122). HFP provides good adhesion, but may have reduced solvent resistance. Phosphate (meth)acrylates, (meth) acrylic acid, and hydroxyl-functional (meth)acrylic commoners could also be used as the comonomer.

Other useful adhesive comonomers used in combination with the one or more fluoromonomers include, but are not limited to one or more of the following:

A) Vinyl alkyl acids, having as a comonomer (M1):

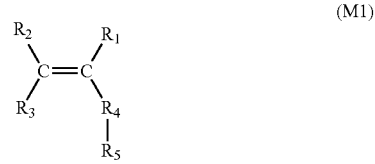

(M1)

Wherein R1, R2, and R3 is a hydrogen or a halogen (F, Cl, Br, I).

Wherein R4 is a C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide.

Wherein R5 is carboxylic acid (C(O)OH), alkali metal carboxylate salt (COO$^-$M$^+$), ammonium carboxylate salt (COO$^-$NH$_4{}^+$), alkylammonium carboxylate salt (COO$^-$N(Alk)$_4{}^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4{}^+$), alkylammonium sulfonate salt (S(O)(O)O$^-$N(Alk)$_4{}^+$).

B) Vinyl alkyl acids, having the formula M2 below:

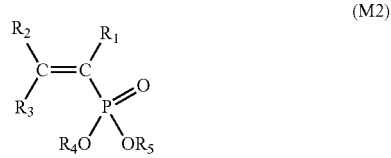

(M2)

Wherein: R1, R2, and R3 is a hydrogen or a halogen (F, Cl, Br, I);

Wherein: R4 and R5 are, separately, hydrogen, a C1 to C16 linear alkyl, branched alkyl, aryl, or cycloalkyl group, a C1 to C16 fluorinated linear alkyl, branched alkyl, aryl or cycloalkyl group, an oligomer of hexfluoropropylene oxide or an oligomer of tetrafluoroethylene oxide, alkali metal ion (Li$^+$, Na$^+$, K$^+$, Rb$^+$, Cs$^+$), ammonium ion (NH$_4{}^+$), or alkylammonium (NAlk$_4{}^+$)

C) Functional acrylates, having as a comonomer (M3):

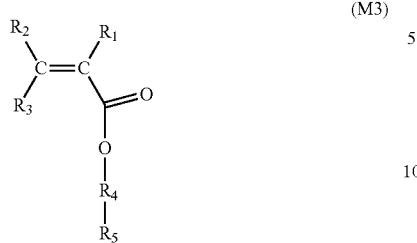

Wherein R1, R2, and R3 is a hydrogen or a halogen (F, Cl, Br, I);
Wherein R4 is a bond, C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide.
Wherein R5 is carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$), epoxide, C1 to C16 alkyl or cycloalkyl carbonate.

In one embodiment, two or more different functional acrylates was found to provide increased adhesion. While not being bound by any particular theory, it is believed that different functionalities, for example an alcohol and acid functionality, could react or crosslink to form ester groups. The two or more different functionalities preferably are present in the same terpolymer, but could also be a blend of two or more different copolymers.

D) Functional acrylamides, having as a comonomer (M4):

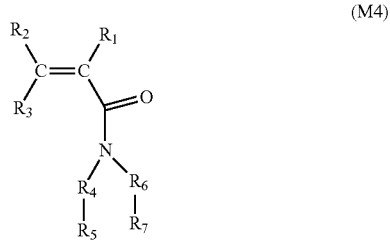

Wherein: R1, R2, and R3 is a hydrogen or a halogen (F, Cl, Br, I).
Wherein: R4 and R5, separately are a hydrogen, C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide.
Wherein: R5 and R6, separately are carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$), ketone (C(O)), or acetylacetonate (C(O)—CH2-C(O)), or phosphonate (P(O)(OH)2), alkali metal or ammonium phosphonate E) Carbonates, containing the comonomer M5:

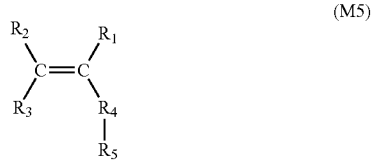

Wherein: R1, R2, and R3 is a hydrogen or a halogen (F, Cl, Br, I).
Wherein: R4 is a bond, a C1 to C16 linear alkyl, branched alkyl, aryl, or cycloalkyl group, a C1 to C16 fluorinated linear alkyl, branched alkyl, aryl or cycloalkyl group.
Wherein: R5 is C1 to C16 cycloalkyl group, a C1 to C16 fluorinated cycloalkyl group, containing a carbonate group as part of the cyclic structure.

F) Vinyl Ethers, having as a comonomer (M6):

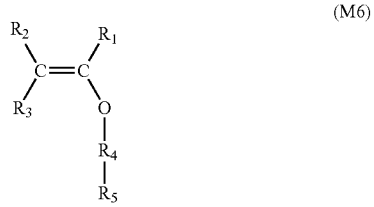

Wherein: R1, R2, and R3 is a hydrogen or a halogen (F, Cl, Br, I).
Wherein: R4 is a C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide.
Wherein: R5 is carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$), ketone (C(O)), acetylacetonate (C(O)—CH2-C(O))

G) Allyloxy compounds having as a comonomer (M7):

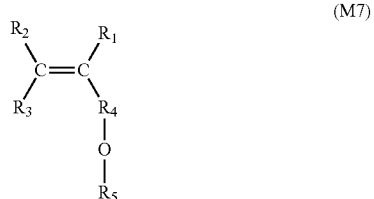

Wherein: R1, R2, and R3 is a hydrogen or a halogen (F, Cl, Br, I).
Wherein: R4 is a C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide.

Wherein: R5 is carboxylic acid (C(O)OH), alkali metal carboxylate salt (COO⁻M⁺), ammonium carboxylate salt (COO⁻NH₄⁺), alkylammonium carboxylate salt (COO⁻N(Alk)₄⁺), alcohol (OH), amide (C(O)NH₂), dialkyl amide (C(O)NAlk₂), sulfonic acid (S(O)(O)OH), alkali metal sulfonate salt (S(O)(O)O⁻M⁺), ammonium sulfonate salt (S(O)(O)O⁻NH₄⁺), alkylammonium sulfonate salt (S(O)(O)O⁻N(Alk)₄⁺), ketone (C(O)), or acetylacetonate (C(O)—CH2-C(O)), or phosphonate (P(O)(OH)2), alkali metal or ammonium phosphonate.

Blend of Non-Functional Fluoropolymer with Functional Compatible Polymer

In some embodiments, the functional fluoropolymer is a blend containing polyvinylidene fluoride and a compatible functional non-fluorinated polymer such as a functional acrylic copolymer of at least one methacrylic acid monomer and at least one methyl methacrylate monomer. The compatible functional non-fluorinated polymer is compatible with the polyvinylidene fluoride. The polyvinylidene fluoride and the compatible functional non-fluorinated polymer are melt blended to form a functional PVDF of this invention.

In some embodiments, the compatible functional non-fluorinated polymer includes at least one monomer selected from the group consisting of α,β unsaturated carboxylic acids, an acrylic monomer containing a hydroxyl group, a monomer containing an epoxy group, a monomer containing silanols, a monomer containing an aldehyde, an alkenyl cyanide, and acetoacetoxyethyl methacrylate.

In some embodiments, a monomer containing an α,β unsaturated carboxylic acids is at least one monomer selected from the group consisting of acrylic acid, methacrylic acid, fumaric acid, crotonic acid, and itaconic acid.

In some embodiments an acrylic monomer containing a hydroxyl group is selected from the group consisting of hydroxyethyl methacrylate, hydroxyethyl acrylate, hydroxypropyl acrylate, hydroxypropyl methacrylate, and diethylene glycol ethyl ether acrylate.

In some embodiments, a monomer containing an epoxy group is selected from the group consisting of glycidyl acrylate and glycidyl methacrylate.

In some embodiments, a monomer containing silanols is selected from the group consisting of γ-trimethoxysilane methacrylate and γ-triethoxysilane methacrylate.

In some embodiments, a monomer containing an aldehyde is acrolein.

In some embodiments, an alkenyl cyanide monomer is selected from the group consisting of acrylonitrile and methacrylonitrile.

In some embodiments, the compatible functional non-fluorinated polymer includes at least one monomer selected from the group consisting of acrylic acid, methacrylic acid, fumaric acid, crotonic acid, itaconic acid, hydroxyethyl methacrylate, hydroxyethyl acrylate, hydroxypropyl acrylate, hydroxypropyl methacrylate, diethylene glycol ethyl ether acrylate, glycidyl acrylate, glycidyl methacrylate, γ-trimethoxysilane methacrylate, γ-triethoxysilane methacrylate, acrolein, acrylonitrile, methacrylonitrile, and acetoacetoxyethyl methacrylate.

In some embodiments, the compatible functional non-fluorinated polymer is a functional acrylic copolymer containing at least one methacrylic acid monomer and at least one methyl methacrylate monomer. In some embodiments, the compatible functional non-fluorinated copolymer is an acid copolymer wherein the acid groups are converted in part to anhydride functionality.

In some embodiments, the fluoropolymer is free of functional groups. In some embodiments, the fluoropolymer is a vinylidene fluoride polymer, an ethylene tetrafluoroethylene polymer, or an ethylene chlorotrifluoroethylene polymer.

In some embodiments, the fluoropolymer is functionalized. The functionalized fluoropolymer may be a functionalized vinylidene fluoride polymer, a functionalized ethylene tetrafluoroethylene polymer, or a functionalized ethylene chlorotrifluoroethylene polymer.

In some embodiments, the functional polyvinylidene polymer blend comprises from about 1% to about 20% by weight of the functional acrylic copolymer. In some embodiments, the polyvinylidene polymer blend comprises less than 5% by weight of the functional acrylic copolymer. Without being bound by theory, excessive functional acrylic copolymer (for example greater than 20 weight percent) may decrease the chemical resistance of the thermoplastic composite made with this functional PVDF made by blending.

The functional acrylic copolymer may comprise from about 1.5% to about 15% by weight of (meth)acrylic acid monomer, or maleic anhydride. In some embodiments, the functional acrylic copolymer may comprise from about 5% to about 15% by weight of (meth)acrylic acid monomer or maleic anhydride. In some embodiments, the functional acrylic copolymer may comprise from about 6% to about 11% by weight of (meth)acrylic acid monomer or maleic anhydride.

As discussed above, in some embodiments, the polyvinylidene polymer blend comprises PVDF and the functional acrylic copolymer. The total content of methacrylic acid monomer may be described as a portion of the entire polyvinylidene polymer blend or as a portion of the functional acrylic copolymer. Unless specified otherwise, methacrylic acid monomer is described as a fraction of the polyvinylidene polymer blend.

The polyvinylidene polymer blend may comprise from about 50 ppm to about 30,000 ppm by weight of methacrylic acid monomer. In some embodiments, the polyvinylidene polymer blend may comprise from about 500 ppm to about 10,000 ppm by weight of methacrylic acid monomer.

In some embodiments, the polyvinylidene polymer blend may comprise at least about 100 ppm, about 200 ppm, about 300 ppm, about 400 ppm, about 500 ppm, about 600 ppm, about 700 ppm, about 800 ppm, about 900 ppm, about 1000 ppm, about 2000 ppm, about 3000 ppm, about 4000 ppm, or about 5000 ppm by weight of methacrylic acid monomer.

In some embodiments, the polyvinylidene polymer blend may comprise at most about 10,000 ppm, about 5000 ppm, about 2800 ppm, about 2600 ppm, about 2500 ppm, about 2400 ppm, about 2300 ppm, about 2200 ppm, about 2100 ppm, about 2000 ppm, about 1900 ppm, about 1800 ppm, about 1700 ppm, about 1600 ppm, about 1500 ppm, about 1400 ppm, about 1300 ppm, about 1200 ppm, about 1100 ppm, or about 1000 ppm by weight of methacrylic acid monomer.

Block Copolymer with Both a Functional End Block, and a Functional Comonomer.

The functional fluoropolymer matrix may include a fluoropolymer having both a low level of functional monomer in the backbone of the fluoropolymer block, and also having a functional, non-fluoropolymer short end block. This would be a similar fluoropolymer block copolymer, such as with a PAA chain transfer agent end block, as described above, with additional functionality found in the fluoropolymer block. While levels of functional comonomers could be in the same range as described above of a functional fluoro copolymer, since the functional co-monomer(s) in the fluoropolymer block are in addition to the functionality contributed by the functional end blocks, the level of functional comonomer not be present in large amounts. Small levels of the randomly distributed comonomer are effective at improving adhesion between the functional matrix and the fibers of the composite. Functional comonomer levels may be present at up to 15 mole percent based on the fluoropolymer block, but are effective down to levels of less than 1 mole percent, less than 500 ppm, less than 250 ppm, less than 150 ppm, and even less than 100 ppm, based on the fluoropolymer block.

Blends of Non-Functional Fluoropolymer with Functional Fluoropolymer

In each of the above mentioned functional fluoropolymer, may further be blended with a compatible non-functional polymer, including but not limited to fluoropolymers and (meth)acrylic polymers. In one preferred embodiment functional PVDF and a non-functional PVDF are blended together to form the matrix of a polymer/fiber composite.

Fibers

The fibers of the invention may have various forms and dimensions, either one-dimensional, two-dimensional or three-dimensional. A fibrous substrate comprises an assembly of one or more fibers. When the fibers are continuous, their assembly forms fabrics.

The one-dimensional form corresponds to linear fibers. The fibers may be discontinuous, chopped or continuous. The fibers could be short fibers (Chopped fibers), or be long, continuous fibers with an aspect ratio of at least 1000, preferably at least 1500, more preferably at least 2000, advantageously at least 3000 and most advantageously at least 5000.

The two-dimensional form corresponds to fibrous mats or nonwoven reinforcements or woven rovings or fiber bundles, which may also be braided.

The three-dimensional form corresponds, for example, to fibrous mats or nonwoven reinforcements or fiber bundles or mixtures thereof which are stacked or folded, an assembly of the two-dimensional form in the third dimension.

The fibrous material are typically synthetic in its origins. Synthetic material includes polymer fibers selected from thermosetting polymer fibers, thermoplastic polymer fibers or mixtures thereof. The polymer fibers may consist of polyamide (aliphatic or aromatic), polyester, polyvinyl alcohol, polyolefins, aramid, polyurethanes, polyvinyl chloride, polyethylene, unsaturated polyesters, epoxy resins and vinyl esters. The mineral fibers may also be selected from glass fibers, particularly of type E, R or S2, carbon fibers, boron fibers or silica fibers. Preferred fibers for the fluoropolymer composite are carbon fibers, glass fibers, and aramid fibers.

The fibers need some surface functionality, in order to interact with the functional groups of the fluoropolymer matrix. Functionality may be added by surface treatment of the fibers, or by sizing.

In one embodiment, the fiber is sized with a functional fluoropolymer sizing, the functional fluoropolymer being formed as described above for the functional fluoropolymer of the matrix. The functionality on the fiber, and that in the matrix may be the same or different, providing the functional groups interact to form an adhesive bonding. In other embodiments, the fiber is functionalized with oxidizing acid, plasma or high temperature oxidation treatments where no additional sizing is required to interact with the functional PVDF matrix.

In some embodiments, the reinforcing fiber is a carbon fiber and is activated to form functional groups. In one embodiment the functional groups are oxygen containing functional groups. In some embodiments, the oxygen containing functional groups are C=O groups. In some embodiments, the oxidized carbon fiber is not sized but used directly. In other embodiments the carbon fiber is then sized with a functionalized PVDF or a non-fluoropolymer functional sizing like epoxy, polyimide, polyamide, etc. The functional binder of matrix then interacts with or adheres to the "sized" or functionalized carbon fiber to increase the adhesion between the matrix/binder and the carbon fiber.

In some embodiments, the reinforcing fiber is a glass fiber sized with silane or other functional polymeric ingredients including potentially a functional PVDF sizing. In some embodiments, the sized reinforcing fiber comprises a silane coupling agent. The silane coupling agent includes a group that can silane bond to the glass fiber and a functional group. In some embodiments, the functional group of the silane coupling agent is an epoxy group or an amide group. The functional group of the silane coupling agent is bonded to a functional polymeric sizing optionally functional PVDF. In all embodiments the functional PVDF matrix interacts or adheres to the fibrous reinforcement improving properties.

In some embodiments the glass fiber is first sized with a functional silane, followed by an over-sizing with a functional fluoropolymer sizing, then used with a functional PVDF matrix as described above.

EXAMPLES

Sizing Carbon Fibers:

All the examples of sized carbon fiber made with functional PVDF for this patent were made in the exact same way. Hexcel AS4 12,000 tow un-sized carbon fiber was used in all examples noted that use functional PVDF sizing as these are not available commercially. The "functional PVDF" were dissolved in 5% DMAC (dimethyl acetamide) to make a fluid solution. A lab scale unit was set up to continuously size this carbon fiber, where the tow was coated, then excess squeezed out, the solvent removed and the sized fiber wound onto a reel.

The wetting tray held the 5% solids solution, and the AS4 tow was passed through this solution using a roller to hold it under the surface. The fiber tow was then passed between two non-moving soft rollers to squeeze out the excess solution and to promote good wet out of the sizing solution around the carbon fibers. The "wet sized" tow was then passed through a hot chamber heated to 150 C with lots of air flow and a dwell time of 90 seconds to remove all the solvent and end up with "dry" sized carbon fiber tow. By weighing one meter of carbon fiber before and after sizing— we calculated the amount of sizing. The sized fibers produced by this process are shown as Example A and Example B in Table 1 below. The sized carbon tow was then chopped to a 6 mm length using an air driven chopper designed for fiber glass from Fibre Glast.

The commercial control carbon fiber sizing used for these trials was from Teijin Toho Tenax. The grade was HT C702—which is a carbon fiber sized for high temperature thermoplastics. This fiber is chopped to 6 mm length as standard.

PVDF homopolymer of approximately 6 k poise melt viscosity at 100 sec-1 was used for these experiments unless otherwise mentioned.

An acrylic acid functional PVDF was produced that had 2500 ppm of acrylic acid added to the polymerization as described above to produce a functional PVDF homopolymer with a melt viscosity of 14 k poise at 100 sec-1 at 230 C. Tests were conducted with this as both a functional sizing (Example B in Table 1, and Example 4 and 5 in Table 3) and as a functional Matrix (Example 1 and 2 in Table 2).

TABLE 1

| Carbon Fiber | Example # and Sizing | Dry Wt % Sizing |
|---|---|---|
| AS4 - 12,000 | A: functional PVDF (0.3% Maleic Anhydride grafted PVDF) - 10 kpoise | 4.1 |
| AS4 - 12,000 | B: functional-PVDF (AA copolymer) - 14 kpoise | 4.2 |
| Toho Tenax HT C702 | Control (commercial unknown sizing) | |

Reinforced composites were prepared using a brabender mixing bowl that holds 5 grams of compound. The matrix resin was first melted in the mixing bowl at 230 C and 45 rpm (for 1 minute). The pre-weighed amount of carbon fiber (15% by weight) is then added to the bowl and the mixing is continued for another 2 minutes. The material is removed from the mixing bowl manually 60 grams was placed into a compression mold. The material was compression molded at 230 C in a 3 inch by 5 inch by ⅛ inch positive displacement mold at 230 C in Carver hot press for 1 min at 1000 psi, 2 min at 5000 psi and then 1 min at 10,000 psi. The mold is removed and cooled under pressure at 10,000 psi in a cooling press. Plaques were then cut into 0.5 inch by 5 inch flex bars using a wet, diamond grit tile saw. The bars were dried and conditioned overnight in 50% RH, 73 F controlled temperature lab before testing according to ASTM D790 in an Instron 4201 and tested in a flex bar configuration at 0.05 inch per minute. The flex strength is recorded. Various combination of carbon fiber and functional or non-functional matrix are noted in Table 2.

TABLE 2

| Example Number | Carbon Fiber/Sizing description/Example # 15 Wt % | Matrix (85 wt %) | Flex Strength ASTM D790 (kpsi) |
|---|---|---|---|
| 1 | A: AS4-12k Sized with MAH grafted PVDF | 14 kpoise functional PVDF copolymer with 2500 ppm AA | 18.8 |
| 2 | Toho Tenax HT C702 | 14 kpoise functional PVDF copolymer with 2500 ppm AA | 17.2 |
| Control | Toho Tenax HT C702 | 6 kpoise PVDF Homopolymer | 13.2 |

The results are shown in Table 2 document the concept of this invention that a functional PVDF matrix can yield enhanced strength to thermoplastic composites in combination with a functional PVDF sizing or when used with standard commercially available sized carbon fibers.

Twin-Screw Extrusion Test:

Additional sized carbon fiber was created by the same procedure noted above only enough to complete a twin-screw extrusion compounding study. The sized carbon fiber produced is Example B noted in Table 1 above—chopped to 6 mm length. The second control carbon fiber is HT C702 that is commercially available and chopped to 6 mm length.

Two examples (3 and 4) and a control formulation were compounded on a 30 mm ZSK twin screw extruder at 230 C with the chopped carbon fiber added using a loss-in-weight side-stuffer to produce 15 wt % chopped carbon fiber in a 6 k poise viscosity PVDF homopolymer. The extruded strands were pelletized and then injection molded into ASTM D790 flex bars using at 220 C. The flex bars were equilibrated for 24 hrs at 50% RH at 73 F, and then tested for flexural strength as noted above.

The results are found in Table 3 below. These show the strength enhancement seen with functional PVDF sizing compare to commercially available sizings (Example 3). It further shows that combining functional PVDF sizing with a functional PVDF matrix that further strength enhancements are possible (Example 4).

TABLE 3

| Example Number | Carbon Fiber 15 Wt % | Matrix (85 wt %) | Flex Strength ASTM D790 (kpsi) |
|---|---|---|---|
| 3 | Example B from Table 1 | 6 kpoise PVDF homopolymer | 19.3 |
| 4 | Example B from Table 1 | 80:20 (PVDF:functional PVDF) 6 kpoise PVDF homopolymer:0.3% MAH grafted PVDF homopolymer - 10 kpoise | 22.5 |
| Control | Toho Tenax HT C702 | 6 kpoise PVDF homopolymer | 13.2 |

Other Twin-Screw Compounding Experiments

Control Example 1

A PVDF homopolymer with a melt viscosity of (MFR) 6 k poise at 100 sec$^{-1}$ was melt compounded on a 30 mm W&P co-rotating twin screw extruder with an LID of 36:1 using down-stream addition of a chopped strand carbon fiber. The PVDF was added to the rear of the extruder using a loss-in-weight feeder and the carbon fiber was added with a down-stream side stuffer using a loss-in-weight feeder. The temperature of extrusion was held at 230° C. and the rpm for the twin-screw was 200 rpm. The feeds were controlled to produce a final product with 15% by weight of carbon fiber. The pellets were then injection molded at 230° C. melt temperature and a mold temperature of 50 C into ASTM D638 type 1 tensile bars and ASTM D790 flexural bars. Properties were testing according to these ASTM protocols.

Descriptions

1) CT-702 is chopped carbon fiber available from Toho Tenax
2) A 6 k poise PVDF homopolymer is used in all cases except where noted
3) MMA/MAA—Functional acrylic is used that contain 90% by weight Methylmethacrylate and 10% by weight methacrylic acid
4) MMA/MAA-Anhy—Functional acrylic from description (3) where 60 to 80% of the MAA functionality has been converted to anhydride functionality by a secondary reactive extrusion process A functional PVDF (Blend 4) was produced by melt blending 95% by weight of PVDF homopolymer with a MV of 6 k poise at 230 C and 100 sec$^{-1}$ and 5% by weight of a functional acrylic copolymer MMA/MAA (description 3 above). This acrylic is compatible with the PVDF homopolymer. The compatible functional acrylic of Example 5 improves adhesion to the existing sizing of the carbon fiber thereby increasing interfacial adhesion and composite strength.

Another functional PVDF (Blend 5) was produced by melt blending 95% by weight of PVDF homopolymer and 5% by weight of a functional acrylic copolymer MMA/MAA-Anhy (description 4 above). In both example 4 and 5, the functional acrylic is fully miscible at a molecular level with PVDF homopolymer. So while the functional groups on the PMMA appear to bond to the carbon fiber being used, because it is fully compatible with the PVDF, it also improves stress transfer to the matrix thereby increasing tensile strength, flexural strength and elongation to break as shown in Table 4 below.

TABLE 4

|  | PVDF | Carbon Fiber | Tensile Str (psi) | Elongation (%) | Flexural Strength (psi) |
|---|---|---|---|---|---|
| Control 1 | 6 kpoise | CT-702 | 13250 | 0.9 | 13650 |
| Example 4 | Blend 4 | CT-702 | 18500 | 2.7 | 26000 |
| Example 5 | Blend 5 | CT-702 | 16550 | 3.3 | 23700 |

What is claimed is:

1. A fiber-reinforced fluoropolymer composite comprising:
   a) a functionalized fluoropolymer composition matrix comprising one or more functionalized fluoropolymers; and
   b) fibers,
wherein said fibers comprise a sizing having functional groups capable of bonding with the functionalized fluoropolymer composition.

2. The fiber-reinforced fluoropolymer composite of claim 1, comprising:
   a) from 40 to 60 weight percent of said fluoropolymer composition matrix, and
   b) from 15 to 60 weight percent of said fibers.

3. The fiber-reinforced fluoropolymer composite of claim 1, wherein at least one said functionalized fluoropolymer is selected from the group consisting of:
   a) a fluoropolymer block copolymer comprising a long fluoropolymer block, and one or more functional end blocks;
   b) a graft copolymer having a fluoropolymer backbone with one or more grafted functional groups;
   c) a fluoropolymer having functional comonomer units as part of the backbone polymer;
   d) a blend of a non-functional fluoropolymer and a compatible functional non-fluoropolymer;
   e) a blend of one or more non-functional fluoropolymers with any of functional fluoropolymers of a), b) or c).

4. The fiber-reinforced fluoropolymer composite of claim 1, wherein said fluoropolymer matrix comprises a polyvinylidene fluoride homopolymer, or a copolymer comprising at least 60 weight percent of vinylidene fluoride monomer units.

5. The fiber-reinforced fluoropolymer composite of claim 3, wherein said block copolymer end block(s) comprise polyacrylic acid blocks.

6. The fiber-reinforced fluoropolymer composite of claim 3, wherein said grafted functional groups comprise epoxide or amide functionality.

7. The fiber-reinforced fluoropolymer composite of claim 3, wherein said functional comonomers are selected from the group consisting of vinyl acetate; 2,3,3,3-tetrafluoropropene (HFO-1234yf); 2,3,3 trifluoropropene; hexafluoropropene (HFP); and 2-chloro-1-1-difluoroethylene (R-1122), phosphate (meth)acrylate; (meth) acrylic acid; hydroxyl-functional (meth)acrylic; vinyl alkyl acids having as a comonomer (M1):

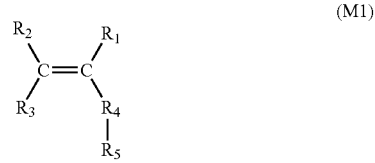

wherein R1, R2, and R3 is a hydrogen or a halogen (F, Cl, Br, I), wherein R4 is a C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide, wherein R5 is carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$); vinyl alkyl acids, having the formula M2 below:

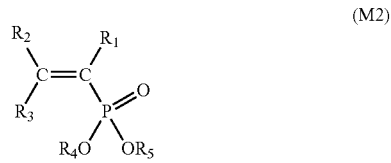

wherein: R1, R2, and R3 is a hydrogen or a halogen (F, Cl, Br, I), wherein: R4 and R5 are, separately, hydrogen, a C1 to C16 linear alkyl, branched alkyl, aryl, or cycloalkyl group, a C1 to C16 fluorinated linear alkyl, branched alkyl, aryl or cycloalkyl group, an oligomer of hexfluoropropylene oxide or an oligomer of tetrafluoroethylene oxide, alkali metal ion (Li$^+$, Na$^+$, K$^+$, Rb$^+$, Cs$^+$), ammonium ion (NH$_4^+$), or alkylammonium (NAlk$_4^+$); functional acrylates, having as a comonomer (M3):

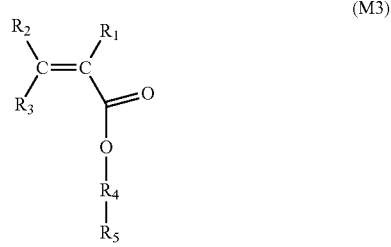

wherein R1, R2, and R3 is a hydrogen or a halogen (F, Cl, Br, I); wherein R4 is a bond, C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide, wherein R5 is carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$), epoxide, C1 to C16 alkyl or cycloalkyl carbonate; functional acrylamides having as a comonomer (M4):

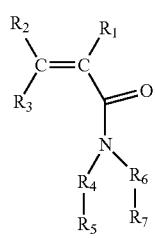

(M4)

wherein: R1, R2, and R3 is a hydrogen or a halogen (F, Cl, Br, I), wherein: R4 and R5, separately are a hydrogen, C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide, wherein: R5 and R6, separately are carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$), ketone (C(O)), or acetylacetonate (C(O)—CH2-C(O)), or phosphonate (P(O)(OH)2), alkali metal or ammonium phosphonate; carbonates, containing the comonomer M5:

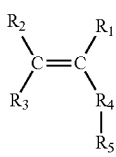

(M5)

wherein: R1, R2, and R3 is a hydrogen or a halogen (F, Cl, Br, I), wherein: R4 is a bond, a C1 to C16 linear alkyl, branched alkyl, aryl, or cycloalkyl group, a C1 to C16 fluorinated linear alkyl, branched alkyl, aryl or cycloalkyl group, wherein: R5 is C1 to C16 cycloalkyl group, a C1 to C16 fluorinated cycloalkyl group, containing a carbonate group as part of the cyclic structure; vinyl Ethers, having as a comonomer (M6):

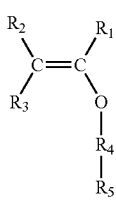

(M6)

wherein: R1, R2, and R3 is a hydrogen or a halogen (F, Cl, Br, I), wherein: R4 is a C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide, wherein: R5 is carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$), ketone (C(O)), acetylacetonate (C(O)—CH2-C(O)); and allyloxy compounds having as a comonomer (M7):

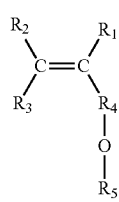

(M7)

wherein: R1, R2, and R3 is a hydrogen or a halogen (F, Cl, Br, I), wherein: R4 is a C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide, wherein: R5 is carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$), ketone (C(O)), or acetylacetonate (C(O)—CH2-C(O)), or phosphonate (P(O)(OH)2), alkali metal or ammonium phosphonate.

8. The fiber-reinforced fluoropolymer composite of claim 3, wherein said compatible functional non-fluoropolymer comprises one or more functional (meth)acrylic polymers.

9. The fiber-reinforced fluoropolymer composite of claim 1, wherein said fibers comprise chopped fibers, and wherein said functionalized fluoropolymer is not a maleic anhydride grafted copolymer.

10. The fiber-reinforced fluoropolymer composite of claim 1, wherein said sizing is a functionalized fluoropolymer composition.

11. The fiber-reinforced fluoropolymer composite of claim 3, wherein said grafted copolymer matrix does not comprise a maleic anhydride graft.

12. The fiber-reinforced fluoropolymer composite of claim 1, wherein said fibers are selected from the group consisting of carbon fibers, glass fibers, and aramid fibers, or mixtures thereof.

13. The fiber-reinforced fluoropolymer composite of claim 1, wherein said fibers have an aspect ratio of aspect ratio of at least 1000.

14. The fiber-reinforced fluoropolymer composite of claim 1, wherein said functionalized fluoropolymer comprises a block fluoropolymer having both a functional comonomer with vinylidene fluoride monomer units, and one or more functional end blocks.

15. The fiber-reinforced fluoropolymer composite of claim 14, wherein said functional end block comprise polyacrylic acid.

16. The fiber-reinforced fluoropolymer composite of claim 1, wherein said functionalized fluoropolymer comprises at least 60 weight percent of vinylidene fluoride monomer units.

17. The fiber-reinforced fluoropolymer composite of claim 3, wherein said functional comonomers comprises at least one of phosphate (meth)acrylate; (meth) acrylic acid; or hydroxyl-functional (meth)acrylic.

18. The fiber-reinforced fluoropolymer composite of claim 3, wherein said functional comonomers comprises acrylic acid.

* * * * *